United States Patent

[11] 3,593,170

[72] Inventor Gerhard Gunter Gassmann
Berkheim, Germany
[21] Appl. No. 841,863
[22] Filed July 15, 1969
[45] Patented July 13, 1971
[73] Assignee International Standard Electric Corporation
New York, N.Y.
[32] Priority Sept. 24, 1968
[33] Germany
[31] P 17 62 921.9

[54] PULSE-WIDTH DISCRIMINATOR HAVING CONDUCTION CONTROLLED MEANS

10 Claims, 10 Drawing Figs.

[52] U.S. Cl. 329/106, 307/234, 307/246, 328/111, 329/102
[51] Int. Cl. H03k 9/08
[50] Field of Search 329/102, 106; 328/111; 307/234, 246; 325/320

[56] References Cited

UNITED STATES PATENTS

| | | | |
|---|---|---|---|
| 3,149,243 | 9/1964 | Garfield | 307/233 X |
| 3,223,912 | 12/1965 | Sheheen | 329/102 (UX) |
| 3,305,732 | 2/1967 | Grossman et al. | 307/233 |
| 3,435,258 | 3/1969 | McAroy | 307/234 |
| 3,506,848 | 4/1970 | Beurrier | 307/234 |

*Primary Examiner*—Alfred L. Brody
*Attorneys*—C. Cornell Remsen, Jr., Walter J. Baum, Percy P. Lantzy, Philip M. Bolton, Isidore Togut and Charles L. Johnson, Jr.

ABSTRACT: A pulse-width discriminator providing a very steep discriminator characteristic. The width modulated input pulses limited to a constant amplitude are rectified and applied to an RC time constant circuit prior to being applied to a transistor whose conduction is controlled by resultant linear sawtooth signals whose duration are equal to the duration of the input pulses. The time constant of the RC circuit, the bias potential applied to the RC circuit and the bias potential applied to the transistor, by means of a Zener diode coupled between the RC circuit and base of the transistor, are so selected that the transistor is blocked for pulse widths below $ti_{min}$, momentarily unblocked for pulse widths between $ti_{max}$ and $ti_{min}$ to pass pulses having amplitudes increasing linearly in the negative direction as the pulse width increases, and saturated for pulse width above $ti_{max}$ to pass pulses having a negative going constant maximum amplitude. The discriminator output voltage is obtained by peak rectification of the pulses passed by the transistor. In another disclosed embodiment, the discriminator output voltage is passed through a low pass filter to provide the bias potential coupled to the RC circuit.

INVENTOR

GERHARD GÜNTER GASSMANN

BY Alfred C. Hill

AGENT

INVENTOR
GERHARD GÜNTER GASSMANN
BY Alfred C. Hill
AGENT

INVENTOR

GERHARD GÜNTER GASSMANN

BY Alfred C. Hill

AGENT

PULSE-WIDTH DISCRIMINATOR HAVING CONDUCTION CONTROLLED MEANS

BACKGROUND OF THE INVENTION

This invention relates to pulse signal discriminators and more particularly to width modulated pulse signal discriminators.

For the demodulation of pulse-width modulated pulse signals it is known to feed the pulse signal to an RC low-pass filter. The filtered voltage corresponds to the mean value of the pulse signal, which is linearly dependent upon the pulse-width. Such a pulse-width demodulation, of course, is very economical, but has the disadvantage that the discriminator characteristic has a very flat or small sloping characteristic in the operating range. In other words, the demodulation efficiency is very poor. This kind of demodulation is unsuitable for use in cases where relatively small pulse-width variations are involved.

In addition, a discriminator having a steep discriminator characteristic is already known, and is suitable for the pulse-width demodulation having a discriminator characteristic similar to that of the present invention. This discriminator operates by utilizing the backward recovery (storage) time of semiconductor elements and is in particular intended for the use in integrated circuits by avoiding the employment of capacitors and coils. Since this discriminator is based on the utilization of the backward recovery (storage) time of semiconductors, the linearity of the discriminator characteristic in the operating range is dependent upon the semiconductor properties which are difficult to control. In addition thereto, this discriminator is unsuitable for large pulse widths at a low pulse frequency, because the backward recovery (storage) of semiconductors cannot be extended at will.

SUMMARY OF THE INVENTION

An object of this invention is to provide a pulse-width discriminator overcoming the disadvantages of the above-described prior art pulse-width discriminators.

Another object of this invention is to provide a pulse-width discriminator having a substantially linear, steeply sloped discriminator characteristic between the pulse widths $ti_{min}$ and $ti_{max}$.

Still another object of this invention is to provide a pulse-width discriminator suitable for very large pulse widths at a very low frequency.

In accordance with the principles of the present invention, the pulse-width discriminator provides a discriminator output voltage having an amplitude value $U_{max}$ at and below a pulse width $ti_{min}$, an amplitude value $U_{min}$ at and above a pulse-width $ti_{max}$ and a substantially linear steeply sloped amplitude value from $U_{max}$ to $U_{min}$.

A feature of the present invention is the provision of a pulse-width discriminator for width modulated pulse signals comprising a source of width modulated pulse signals having a constant amplitude; conduction controlled means; first means coupled to the conduction controlled means to provide a predetermined value of first bias potential for the conduction controlled means; second means coupled between the source and the conduction controlled means to convert the pulse signal to substantially linear sawtooth signals having a duration equal to the width of the pulse signals, the sawtooth signals and the first bias potential controlling the conduction of the conduction controlled means; and third means coupled to the conduction controlled means for rectification of the output signal thereof to provide the discriminator output voltage.

The pulse-width discriminator of this invention has the advantage of (1) being suitable for randomly min pulse widths at max frequencies, (2) having a steep and almost linear discriminator characteristic within the operating range between the pulse-widths $t_{min}$ and $ti_{max}$, with the inclination of this portion of the discriminator characteristic and the linearity thereof capable of being controlled in a relatively simple way with the aid of circuit-technical means and, (3) outside the range $ti_{min}$ and $ti_{max}$ the discriminator characteristic has a horizontal path. This last-mentioned property is particularly desirable when employing the pulse-width discriminator in control circuits (e.g. in speed regulators for motors), because in control circuits an opposite inclination of the discriminator characteristic in relation to the working range would cause considerable problems. Even in the case of large deviations from the actual working range, the discriminator output voltage maintains a value corresponding to the respective minimum or maximum value, so that there is obtained a criterion for the detuning direction.

BACKGROUND OF THE INVENTION

The above-mentioned and other features and objects of this invention will become more apparent by reference to the following description taken in conjunction with the accompanying drawings, in which.

DESCRIPTION OF THE PREFERRED EMBODIMENTS

Figures 1, 2A:
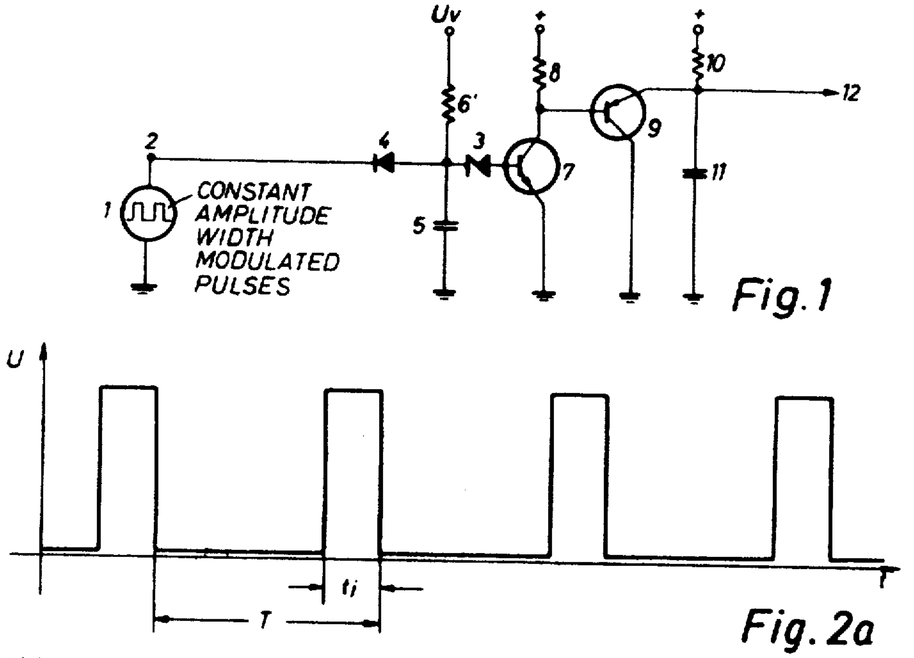
FIG. 1 is a schematic circuit diagram of a pulse-width discriminator in accordance with the principles of this invention.

Referring to FIG. 1, source 1 provides constant amplitude width modulated pulses. From the output terminal 2 of source 1, the pulse signal is fed to rectifier 4 and then to RC-circuit 5,6 biasing potential $U_V$ for rectifier 4 being applied to resistor 6 of this RC-circuit. The voltage produced in capacitor 5 having a sawtooth-shaped portion is fed, in the example illustrated, via Zener diode 3 to the base electrode of the transistor stage 7 which, in the present example, includes a transistor of the NPN-conductivity type. Zener diode 3 may be eliminated in cases where the emitter electrode of transistor 7 receives a positive biasing potential, or in cases where a fixed negative biasing potential is superimposed upon the pulse voltage of source 1. Resistor 8 is the collector resistance of transistor 7. A transistor 9 coupled to the collector of transistor 7, operating in a grounded collector arrangement, serves as a peak rectifier having a high input resistance and which, in the present example, is a PNP-type transistor. Resistor 10 is the operating resistance of rectifier 9 and capacitor 11 is a blocking capacitor. In addition thereto, from the emitter electrode of transistor 9, the discriminator output voltage is taken from terminal 12. In cases where resistor 10 and the loading of the terminal 12 is relatively high, it is possible to use a diode instead of the transistor rectifier 9.

Figures 2B, 2C:
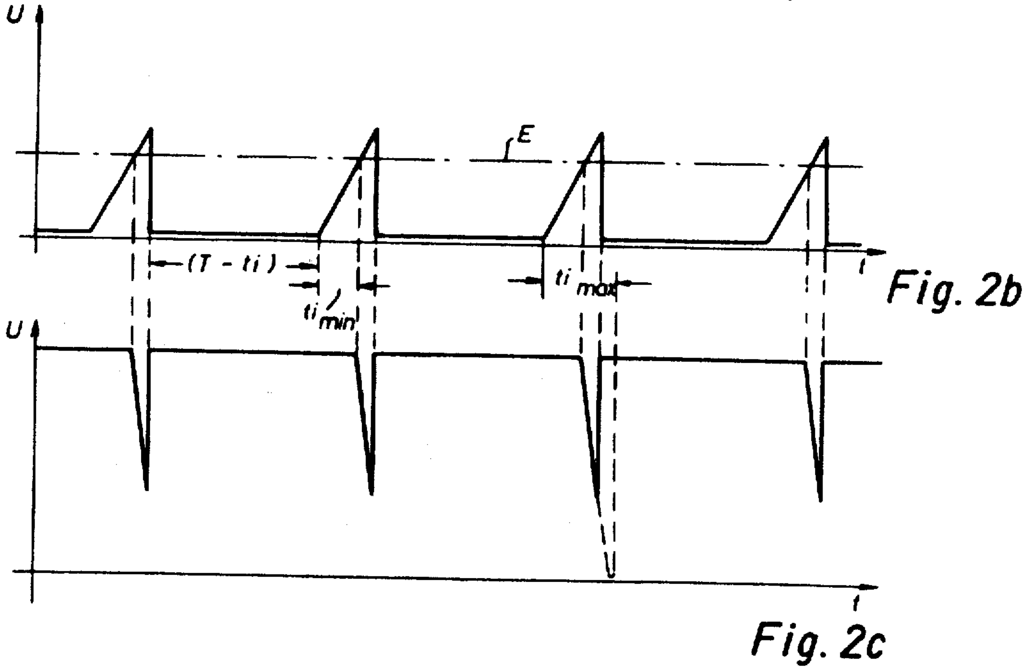
FIGS. 2, 3 and 4 are curves illustrating the operation of the circuit of FIG. 1.
Figures 3A, 3B, 3C, 3D:
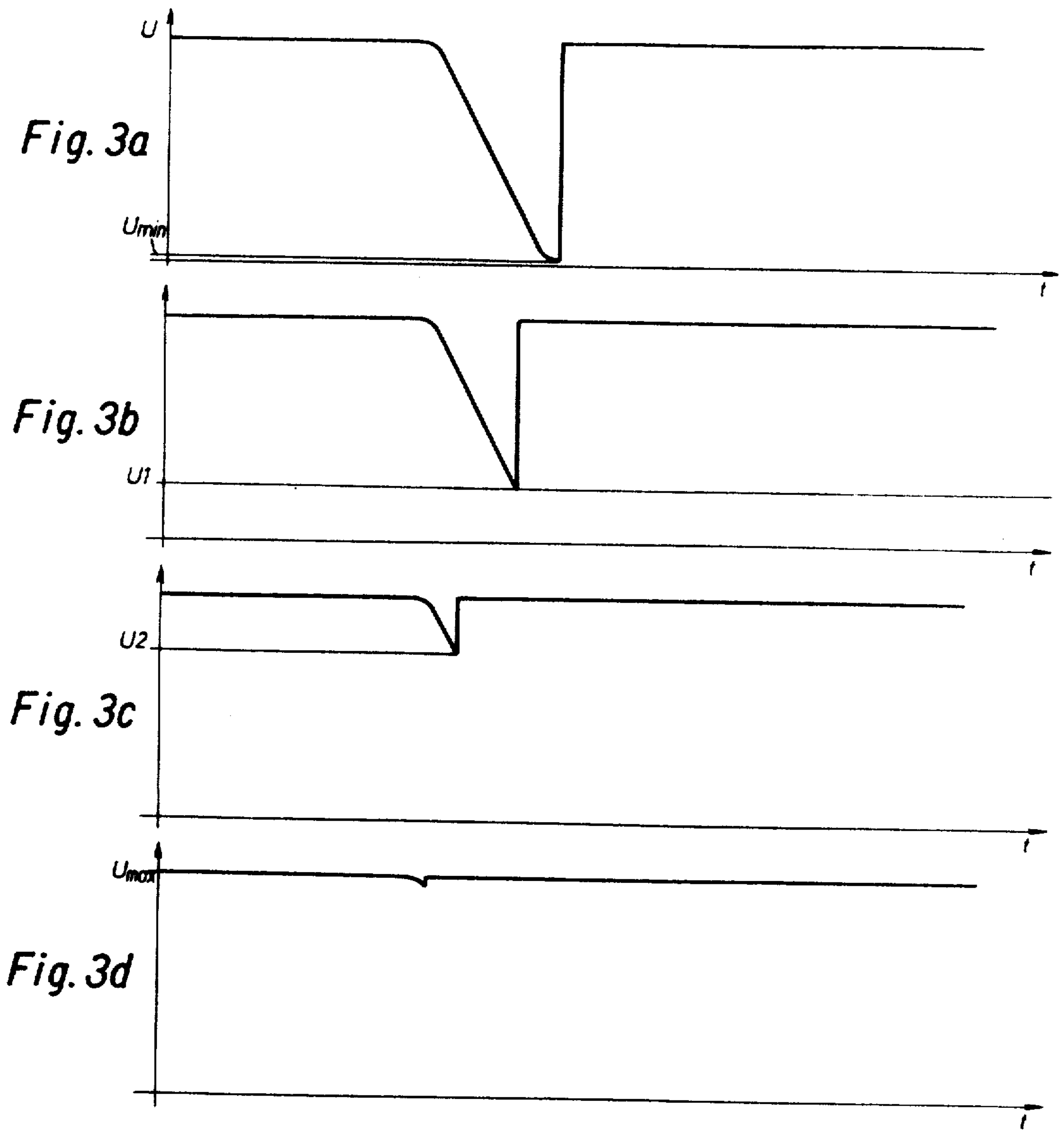

For explaining the mode of operation of the circuit according to FIG. 1, reference is made to FIGS. 2*a* to 2*c*. In FIG. 2*a* there is shown V input pulse signals which are restricted to a constant amplitude value. *T* indicates the duration of the period of the pulse signal. The discriminator circuit is responsive to the pulse width *ti*. FIG. 2*b* shows the voltage at capacitor 5. During the time (*T—ti*), rectifier 4 is conductive, so that the voltage at capacitor 5 is identical to the momentary value of the pulse voltage. Upon expiration of the period of time (*T—ti*), rectifier 4 is blocked, so that capacitor 5 is charged by the rectifier biasing potential $U_V$ via resistor 6. FIG. 2*b* shows the voltage value, as plotted by the dot-and-dash line E, at which transistor 7, by employing Zener diode 3, starts to become conductive. When the voltage at capacitor 5 rises beyond this voltage value, the collector voltage of transistor 7 will drop off linearly with a very steep slope. FIG. 2*c* shows this collector voltage. Upon expiration of the period of time *ti*, rectifier 4 is rendered conductive again, so that now the voltage at capacitor 5 will drop again to almost zero volt, transistor 7 is blocked and, consequently, the collector voltage of transistor 7 reassumes the original positive value. In this way, at the collector of transistor 7 there will appear negatively directed needle pulses which, in reality, are much narrower than shown in FIG. 2c. The amplitude of these needle pulses is substantially linearly dependent upon the increase of the pulse width $ti$. In the case of pulse width $t_{max}$, these pulses reach a maximum negative value because in this case transistor 7 is completely driven into saturation. The pulse signal in FIG. 2c, at the collector of transistor 7, is rectified with the aid of peak rectifier 9 which, in the illustrated example, is a PNP-type transistor operating in a grounded collector arrangement. The discriminator output voltage is taken off the emitter of transistor 9 via terminal 12. From FIGS. 2a to 2c, it is recognizable that in the case of pulse widths smaller than $ti_{min}$ transistor 7 will always remain blocked, so that the discriminator output voltage appearing at terminal 12 is identical to the positive supply voltage which, in this particular example is positive. In the case of pulse widths greater than $ti_{max}$ transistor 7 is completely driven into saturation so that a constant voltage $U_{min}$ will appear at terminal 12. In FIG. 2c, for the purpose of defining the pulse width $ti_{max}$, the full pulse amplitude has been indicated by dash-lines.

In FIGS. 3a to 3d the pulse voltage at the collector of transistor 7 is shown in an expanded fashion with respect to various pulse widths $ti$ within the operating range $ti_{min}$ and $ti_{max}$. As is recognizable therefrom, the amplitude value of these negatively directed pulses increases almost linearly with the pulse width $ti$. The voltage $U_{min}$ in FIG. 3a corresponds to the discriminator output voltage relating to the pulse width $ti_{max}$. The value $U_{max}$ in FIG. 3d corresponds to the voltage value of the discriminator output voltage in the case of a pulse width lying below $ti_{min}$. The voltages $U_1$ and $U_2$ in FIGS. 3b and 3c correspond to the pulse widths $t_1$ and $t_2$ lying between the values $ti_{min}$ and $ti_{max}$.

Figure 4:
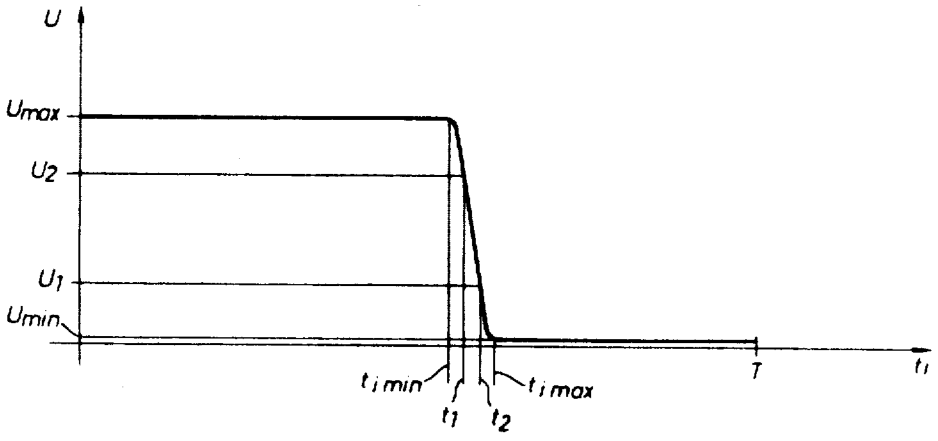

In FIG. 4 there is plotted the discriminator characteristic, the function of the discriminator output voltage, versus the pulse width $ti$. In this FIG. 4 there are used again the same reference symbols as in FIGS. 2a to 3d. The discriminator characteristic ends at the value $ti=T$, in other words, when the pulse width is equal to the duration of period $T$ and, consequently, when the pulse signal itself disappears. When reducing the frequency of the pulse signal, the duration of the period $T$ increases, and the discriminator characteristic of FIG. 4 is extended correspondingly.

Figure 5:
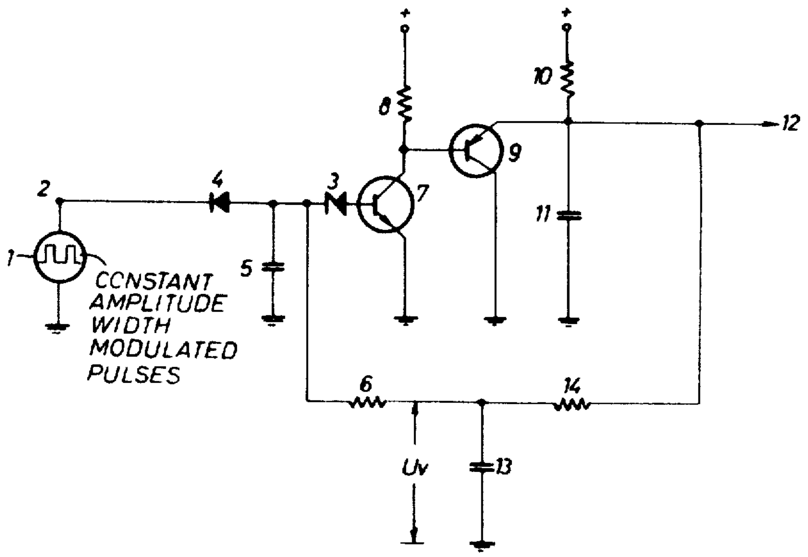
FIG. 5 is a schematic circuit diagram of another embodiment of the pulse-width discriminator in accordance with the principles of this invention.

In FIG. 5 identical parts are indicated by the same reference numerals as in FIG. 1. The arrangement according to FIG. 5 only differs from the arrangement according to FIG. 1 in that the biasing potential $U_V$ for rectifier 4 is not fixed or firm, but is dependent upon or identical to the mean value of the discriminator output voltage. By this technique this is provided that in the case of pulse width modulated signals, the dynamic characteristic, now as before, is very steep, whereas the static characteristic takes an extremely flat path, so that tolerances can be absorbed completely and a balancing of the circuit is rendered superfluous. If, for example, the static value of the discriminator output voltage drops off, e.g., owing to the aging of components, then also the voltage $U_V$ will drop off, with this voltage being obtained from the discriminator output voltage by filtering with the aid of the RC low-pass filter 13, 14. Owing to this drop of voltage $U_V$ there is extended the period of time $t_{min}$, so that the amplitude of the negative pulse peaks at the collector of transistor 7 will drop off, thus causing the discriminator output voltage to increase. As will be recognized therefrom, this arrangement has an extremely strong feedback effect. The low-frequency portion of the discriminator output voltage appearing in the case of pulse width modulated input signals, however, is not being returned because the time constant of the circuits 13, 14 is so dimensioned that even the lowest low-frequency component is not feedback at all, or only to a negligible extent. Owing to this strong feedback, it becomes possible that the discriminator automatically tunes itself to have its operating range at the medium pulse width of the input signal. In so doing, the medium pulse width may vary within wide limits, e.g., 1:20.

In cases where the operating portion of the discriminator curve is supposed to have an opposite slope, it is necessary to provide instead of the NPN-type transistor 7, one of the PNP-type, and to use instead of the PNP-type transistor 9, one of the NPN-conductivity type. Moreover, rectifier 4 must be coupled in the circuit with an opposite polarity. Furthermore, both the battery or supply voltage and the biasing potential $U_V$ must be given an inverted polarity.

While I have described above the principles of my invention in connection with specific apparatus, it is to be clearly understood that this description is made only by way of example.

I claim:

1. A pulse-width discriminator for width modulated pulse signals comprising:
   a source of width modulated pulse signals having a constant amplitude;
   conduction controlled means;
   first means coupled to said conduction controlled means to provide a predetermined value of first bias potential for said conduction controlled means;
   second means coupled between said source and said conduction controlled means to convert said pulse signals to substantially linear sawtooth signals having a duration equal to the width of said pulse signals, said sawtooth signal and said first bias potential controlling the conduction of said conduction controlled means; and
   third means coupled to said conduction controlled means for rectification of the output signal thereof to provide the discriminator output voltage.

2. A discriminator according to claim 1, wherein:
   said third means includes a peak rectifier.

3. A discriminator according to claim 2, wherein:
   said peak rectifier includes a transistor connected in a grounded collector circuit arrangement.

4. A discriminator according to claim 1, wherein:
   said conduction controlled means includes:
   a transistor circuit, said transistor being rendered nonconductive when the pulse width of said pulse signals is below a given minimum pulse width, momentarily conductive when the pulse width of said pulse signals is between said given minimum pulse width and a given maximum pulse width to pass pulses whose amplitude increases linearly in a negative direction as the pulse width of said pulse signals increase, and saturated when the pulse width of said pulse signals is above said given maximum pulse width.

5. A discriminator according to claim 1, wherein:
   said first means includes a Zener diode coupled between said conduction controlled means and said second means.

6. A discriminator according to claim 1, wherein:
   said second means includes:
   fourth means coupled to said source to rectify said pulse signals, and
   fifth means having a given time constant coupled to said fourth means responsive to said rectified pulse signals to produce said sawtooth signals.

7. A discriminator according to claim 6, wherein:
   said fifth means includes:
   a resistor-capacitor time constant circuit, and
   sixth means coupled to said time constant circuit to provide a second bias potential therefore.

8. A discriminator according to claim 7, wherein:
   said sixth means includes a source of fixed bias potential.

9. A discriminator according to claim 7, wherein:
   said sixth means includes:
   seventh means coupled between said third means and said time constant circuit to provide said second bias potential varying according to said discriminator output voltage.

10. A discriminator according to claim 1, wherein:
   said second means includes:
   a rectifier coupled to said source of pulse signals,
   a source of bias potential, and a resistor-capacitor time constant circuit having the junction of said resistor and said capacitor coupled to said rectifier and the other end of said resistor coupled to said source of bias potential to produce said sawtooth signals;

said conduction controlled means includes:

a NPN-type transistor circuit, said transistor being rendered nonconductive when the pulse width of said pulse signals is below a given minimum pulse width, momentarily conductive when the pulse width of said pulse signals is between said given minimum pulse width and a given maximum pulse width to pass pulses whose amplitude increases linearly in a negative direction as the pulse width of said pulse signals increase, and saturated when the pulse width of said pulse signals is above said given maximum pulse width;

said first means includes:

a Zener diode coupled between the junction of said resistor and said capacitor and the base of said transistor; and said third means includes:

a peak rectifier having a PNP-type transistor connected in a grounded collector circuit arrangement.